United States Patent
Daugela

(10) Patent No.: US 10,228,549 B2
(45) Date of Patent: *Mar. 12, 2019

(54) FLAT WEDGE-SHAPED LENS

(71) Applicant: Spectrum Optix Inc., Calgary, Alberta (CA)

(72) Inventor: John Daugela, Calgary (CA)

(73) Assignee: SPECTRUM OPTIX INC., Calgary, Alberta (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/647,075

(22) Filed: Jul. 11, 2017

(65) Prior Publication Data

US 2017/0307864 A1 Oct. 26, 2017

Related U.S. Application Data

(63) Continuation of application No. 15/222,058, filed on Jul. 28, 2016, now Pat. No. 9,759,900.

(Continued)

(51) Int. Cl.
*G02B 26/08* (2006.01)
*G02B 17/08* (2006.01)
(Continued)

(52) U.S. Cl.
CPC ......... *G02B 17/0856* (2013.01); *G02B 13/22* (2013.01); *G02B 21/04* (2013.01); *G02B 23/02* (2013.01); *G02B 26/0816* (2013.01); *G02B 27/0025* (2013.01); *G02B 27/0911* (2013.01); *G02B 27/0972* (2013.01); *G02F 1/29* (2013.01); *G06T 5/006* (2013.01); *H04N 9/646* (2013.01);
(Continued)

(58) Field of Classification Search
CPC .... G02B 17/0856; G02B 13/22; G02B 21/04; G02B 23/02; G02B 26/08; G02B 26/0816; G02B 27/0025; G02B 27/4211; G02F 1/29; G06T 5/006; H04N 9/646
USPC ...................................... 359/225.1
See application file for complete search history.

(56) References Cited

U.S. PATENT DOCUMENTS 3,200,250 A    8/1965    Bouwers
4,623,225 A    11/1986   Forkner
(Continued)

OTHER PUBLICATIONS

International Search Report and Written Opinion for corresponding International Application No. PCT/IB2016/054526 dated Oct. 20, 2016, 7pp.

(Continued)

*Primary Examiner* — Euncha P Cherry
(74) *Attorney, Agent, or Firm* — Lewis Roca Rothgerber Christie LLP

(57) ABSTRACT

A flat lens system includes a wedge-shaped refractive material having a first surface and a second surface opposite to the first surface for refracting incident light beams from an object having a width of Y, from the first surface towards the second surface; a reflective material positioned at the second surface of the wedge-shaped refractive material for reflecting the refracted light beams at a first angle toward the first surface, wherein the reflected light beams are refracted from the first surface at a second angle to form an image of the object having a width of X and including chromatic aberrations; and an apparatus for processing the image of the object to reduce said chromatic aberrations.

20 Claims, 5 Drawing Sheets

Related U.S. Application Data

(60) Provisional application No. 62/201,428, filed on Aug. 5, 2015.

(51) Int. Cl.

| | | |
|---|---|---|
| *G02B 27/00* | (2006.01) | |
| *G02F 1/29* | (2006.01) | |
| *G02B 23/02* | (2006.01) | |
| *G02B 21/04* | (2006.01) | |
| *G02B 13/22* | (2006.01) | |
| *G06T 5/00* | (2006.01) | |
| *H04N 9/64* | (2006.01) | |
| *G02B 27/09* | (2006.01) | |
| *G02B 27/42* | (2006.01) | |
| *G02B 26/12* | (2006.01) | |

(52) U.S. Cl.
CPC .......... *G02B 26/12* (2013.01); *G02B 27/4211* (2013.01); *G06T 2207/10024* (2013.01)

(56) References Cited

U.S. PATENT DOCUMENTS

| | | | |
|---|---|---|---|
| 4,627,690 | A | 12/1986 | Fantone |
| 4,750,819 | A | 6/1988 | Sugiki |
| 4,872,747 | A | 10/1989 | Jalkio et al. |
| 5,568,315 | A | 10/1996 | Shuman |
| 5,995,284 | A | 11/1999 | Vanderwerf |
| 9,759,900 | B2 * | 9/2017 | Daugela ............ G02B 17/0856 |
| 2006/0261274 | A1 | 11/2006 | Thomson et al. |
| 2006/0291704 | A1 | 12/2006 | McClurg |
| 2015/0378186 | A1 | 12/2015 | Xiong et al. |

OTHER PUBLICATIONS

Partial Supplementary European Search Report dated Nov. 30, 2018 for corresponding European Application No. 16832390.5 (12 pages).

\* cited by examiner

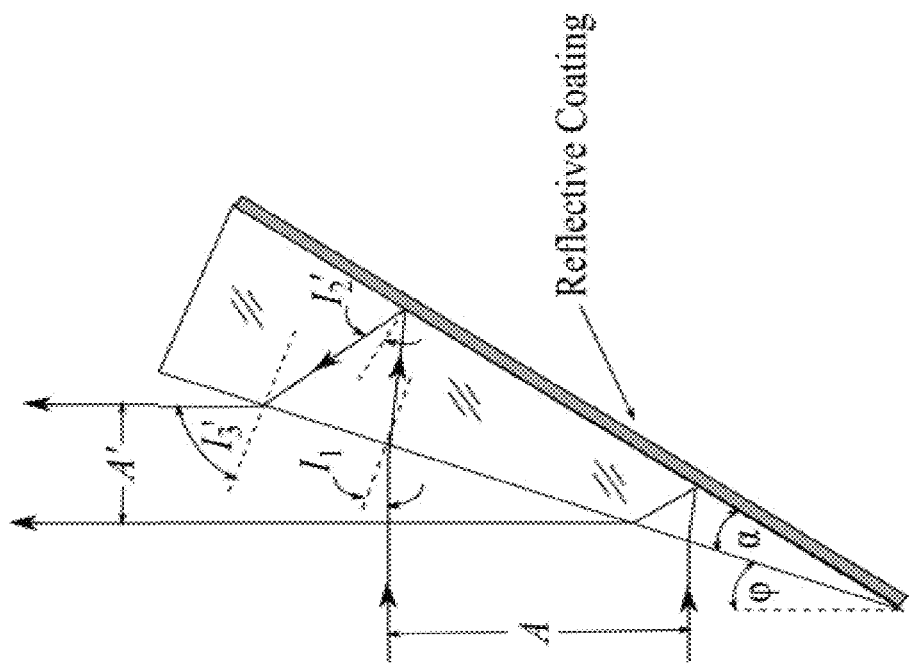

FLAT WEDGE-SHAPED LENS

CROSS-REFERENCE TO RELATED APPLICATIONS

This patent application is a continuation of U.S. patent application Ser. No. 15/222,058, filed on Jul. 28, 2016, which claims the benefits of U.S. Provisional Patent Application No. 62/201,428, filed on Aug. 5, 2015, and the entire contents of which are hereby expressly incorporated by reference.

FIELD OF THE INVENTION

The disclosed invention generally relates to a flat lens system and correcting aberrations of images from the flat lens system using configuration and image processing techniques.

BACKGROUND

Anamorphic prism systems are known to compress or expand light beams, but they have not been used for image capture for a variety of reasons. These prism systems are afocal, and do not focus an image onto an image plane, making them unsuitable as an imaging system. Typically, anamorphic prism systems are designed for collimated light from one incident angle and therefore their performance degrades with off axis light, resulting in a lens with a very limited field of view. Many anamorphic prisms have chromatic dispersion resulting in chromatic aberrations making them unsuitable for multi-color images. Accordingly, anamorphic prism systems are almost exclusively used to shape laser beams, often monochromatic, and are generally referred to as beam expanders and beam compressors.

Achromatic anamorphic prism systems, generally require multiple prisms making them large and heavy. In addition, since the achromatic anamorphic prism systems only compress or expand in one dimension, it would require multiple of these systems to compress equally in two dimensions to maintain the image aspect ratio, which makes the systems even larger and heavier. For these reasons anamorphic prism systems have not been used for image capture.

Imaging devices such as cameras, microscopes and telescopes can be heavy and large. A large portion of this weight is due to the design of the optical lens elements, which can include heavy curved lenses, and the structure to support these lens separated by long focal distances. These imaging devices can be large (thick) mainly because in a typical lens system, the opening aperture to system device depth ratio is small. Moreover, to optically improve image resolution with the traditional lens systems, more device depth (longer focal length) is required in order to reduce lens refraction and minimize lens aberrations. The device depth of the imaging device can limit the imaging systems' performance and design. For example, the size and weight constraints of mobile, compact, or weight constrained imaging devices can limit resolution because they constrain the maximum focal length. The disclosed invention can increase the effective focal length in these systems, and improve resolution with the same size and weight constraints.

Additionally, conventional curved lenses have many different types of aberrations that reduce image resolution (spherical, coma, chromatic, and others). To correct these aberrations, conventional curved lenses use extra large pieces of precision glass, adding weight, size and cost to the lens system. The disclosed invention can reduce the size, weight and resulting cost of conventional curved lenses, and in some devices eliminate their use entirely.

SUMMARY OF THE INVENTION

In some embodiments, the disclosed invention is a flat lens system which includes: a wedge-shaped refractive material having a first surface and a second surface opposite to the first surface for refracting incident light beams from an object having a width of Y, from the first surface towards the second surface; a reflective material positioned at the second surface of the wedge-shaped refractive material for reflecting the refracted light beams at a first angle toward the first surface, wherein the reflected light beams are refracted from the first surface at a second angle to compress or expand the light from the object having a width of X and including chromatic aberrations; and an apparatus for forming and processing the image of the object to reduce said chromatic aberrations.

In some embodiments, X is smaller than Y to compress the image of the object for use in a telescope, for instance. In some embodiments, X is larger than Y to expand the image of the object for use in a microscope, for example.

In some embodiments, the reflective material may include one or more moving or rotating mirrors to reflect the refracted light beams at varying angles toward the first surface.

BRIEF DESCRIPTION OF THE DRAWINGS

A more complete appreciation of the disclosed invention, and many of the attendant features and aspects thereof, will become more readily apparent as the disclosed invention becomes better understood by reference to the following detailed description when considered in conjunction with the accompanying drawings in which like reference symbols indicate like components.

FIG. 2A illustrates a wedge-shaped refractive material, according to some embodiments of the disclosed invention.

DETAILED DESCRIPTION

Embodiments of the disclosed invention are directed to a flat lens system to obtain a high quality image with a more compact optical lens system and correcting aberrations of images from the flat lens system using configuration and image processing techniques. Increasing the initial surface area of the lens objective (aperture) allows more electromagnetic (EM) wave energy to be collected, and can result in a faster and better image quality. However, increasing the aperture to improve image quality and speed typically results in a proportionally larger size lens system and device depth.

The flat lens system according to the disclosed invention has an increased initial surface area of the lens objective (aperture), with a decreased corresponding device depth in the lens stack. The flat lens system collects the EM waves, such as visible and nonvisible lights, with a much larger aperture-to-device depth ratio. This means higher quality images can be captured faster with a smaller device depth. A flat lens system may be very large for telescopes for example, and small for microscopes, and yet maintain a large aperture-to-device depth ratio.

Figure 1:
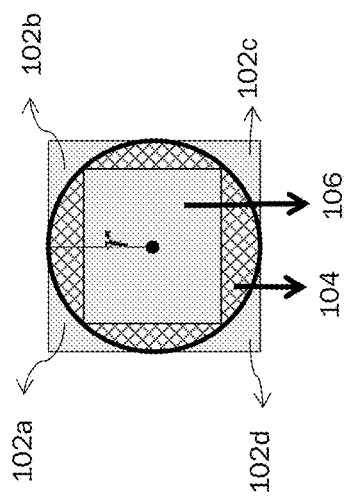
FIG. 1 shows a comparison of a tradition circular curved lens with a flat (wedge) lens, according to some embodiments of the disclosed invention.

FIG. 1 shows a comparison of a tradition circular curved lens with a flat (wedge) lens, according to some embodiments of the disclosed invention. The figure shows how a flat lens system with a square light sensor can collect twice as much light as a conventional lens system with circular lens, and a square light sensor. As shown, the area 106 of the rectangular light sensor is $2r^2$, while the area 104 of the circular lens is $\pi r^2$, which is larger. The area 102 is 2r by 2r=$4r^2$. As seen, a flat (wedge) lens system captures twice the light in a device with a similar frontal area, and therefore can take higher quality images and do so in a faster manner. This ratio would be even larger for rectangular sensors, which most sensors are.

In some embodiments, the disclosed invention provides a flat lens system and image processing methods with an increased lens aperture to device depth ratio and corrects aberrations and distortions in the images produced by the lens. In some embodiments, the disclosed invention is capable of optical EM wave compression and/or expansion. Some applications for the flat (wedge) lens of the disclosed invention include both imaging and non-imaging applications. Examples of imaging applications are cameras, microscopes, telescopes, binoculars, scopes, telecentric lenses, and the like. Examples of non-imaging applications are architectural light pipes, which could provide indoor illumination using natural light, and solar concentrators for more efficient solar energy generation.

Figure 2:
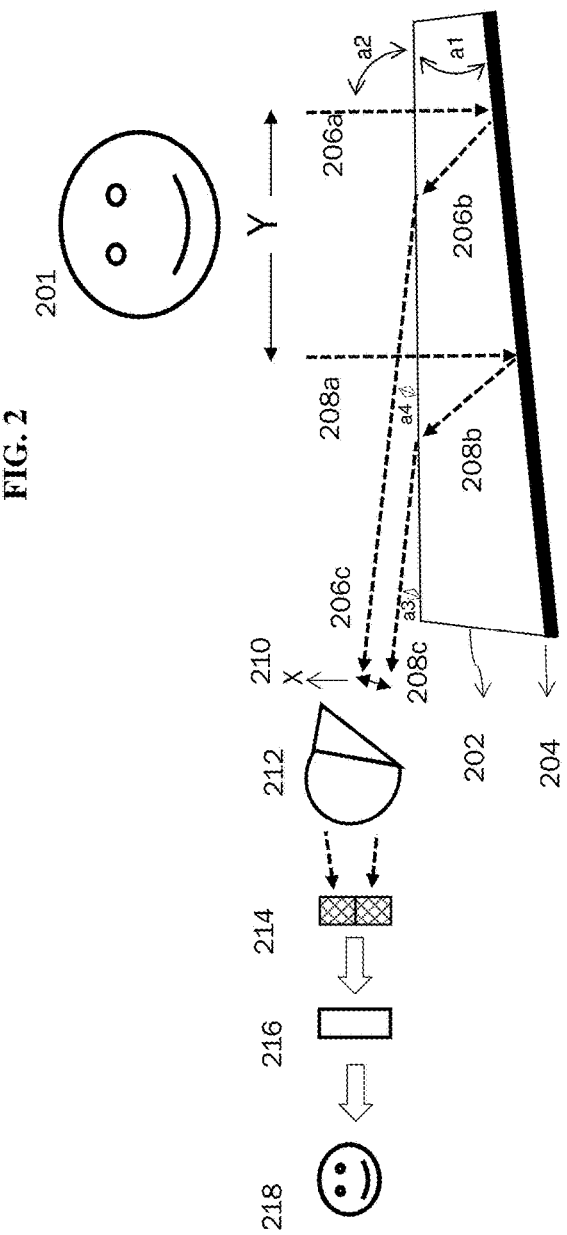
FIG. 2 shows an exemplary configuration of a flat lens system, according to some embodiments of the disclosed invention.

FIG. 2 shows an exemplary configuration of a flat lens system, according to some embodiments of the disclosed invention. A wedge shaped refractive material 202 with angles a1 and a2 is formed on top of a reflective surface 204 to form a flat lens. The image of an object 201 with a width of Y is reflected from multiple surfaces of the flat (wedge) lens, processed and compressed to form a compressed image 218 of the same object. As shown, light (EM) waves 206a and 208a at the two ends of object 201 are penetrated into the refractive material 202 and reflected from the reflective surface 204 at an angle to form light waves 206b and 208b, respectively. The reflected lights (EM) 206b and 208b are further reflected from the internal surface of the refractive material 202 to form light waves 206c and 208c, respectively. The angle of the light waves 206c (a4) and 208c (a3) leaving the refractive material can be designed for specific applications, using conventional optical design methods. Reflected light waves 206c and 208c now form a smaller size X (compressed) image 210 of the original object 201.

Varying angles a1 and/or a2 will vary the size X of the compressed image 210. The size X of compressed image 210 varies with the EM wavelength, angle a1 and a2, and the type of the refractive material 202. Angles a1 and/or a2 values can be varied for specific applications, such as the degree of the compression (X) needed. In many typical applications, angles a1 is between 15 and 25 degrees and a2 is between 75 to 105 degrees. Exit beam angles of a3 and a4 can be modified by varying angles a1 and/or a2 until the critical angle is reached which then alters the beam path to total internal reflection.

Referring back to FIG. 2, the compressed image is then directed to an optional focusing lens 212 to focus the compressed image onto light sensor(s) 214 (for example, CCD or CMOS sensor(s)). In some embodiments, the focusing lens 212 focuses the compressed image onto an eyepiece for viewing by a human. An image processor 216 (implemented in software, hardware and/or firmware) corrects for any aberrations resulting from the lens system by using one or more image processing techniques. An example of correcting chromatic aberrations in hardware would be the use of one or more optical wedges and/or diffraction gratings, before the light sensor 214, that together have an achromatic effect for imaging. The refractive properties of the material of the wedge 202 can be changed to assist in controlling chromatic dispersion for imaging applications as well. For example, the refractive index of the wedge can be dynamically changed by applying voltage to current to the wedge comprised of certain material that refract the light differently under electric power.

If the image processing is performed by an optical device (hardware), the correction is done before the image is received by the sensor. However, if the image processing is performed by software (executed on a processor), the corrections are performed after the image is received by the image sensor, that is, at the output of the sensor.

In some embodiments, the chromatic dispersion for the output image is dynamically measured (for example, at predetermined intervals) and a corresponding voltage (or current) is applied to the wedge to change its refractive index and/or its beam absorption to compensate for the measured chromatic dispersion. In some embodiments, the amount of the voltage (or current) applied to the wedge is determined from a stored lookup table, taking into account the measured chromatic dispersion and the type of the wedge material.

Characterizing the chromatic dispersion per device, and applying software algorithms in the image processor 216 to the image, can also be used to assist in controlling chromatic dispersion for imaging There are many known image processing techniques to correct for image aberrations. One method is to calculate or measure the aberrations of the system, for example, by creating spot diagrams, which are different for each wavelength of light, and then apply an inverse transfer function to reverse these aberrations.

The refractive material 202 may be made of any type of glass, plastic, fluids such as water, or similar types of refractive materials. In case of a fluid, such as water, the fluid may also be used to allow cooling of the optics. The reflective surface 204 may be any type of mirror or other material having a reflective surface. Such reflective surface may be attached or coated on such material to form the reflective surface 204.

The flat lens of the disclosed invention may have any rectangular shape, rather than a square shape, which allows for variable compression ratio and aspect ratio of the image being formed. In some embodiments, the wedge angles a1 and a2 can be variable as the specific applications require. For example, using common BK7 glass, a typical wedge angle a2 may vary between 75 and 105 degrees, in some embodiments. Choosing an angle a2 closer to 75 degrees will result in higher energy captured and lower chromatic aberration but have lower compression. However, choosing an angle a2 closer to 105 degrees results in a higher compression of the image at the expense of higher energy losses and larger chromatic aberration. Angle a1 can be varied to produce similar effects.

Although FIG. 2 and its description is directed to visible light and an image, those skilled in the art would recognize that the flat lens of the disclosed invention is not limited to visible light. Rather, the disclosed invention is capable of operating on any type of EM wave that can refract, with or without forming an image.

FIG. 2A illustrates a wedge-shaped refractive material (prism), according to some embodiments of the disclosed invention. As shown a reflective material is coated or attached to the back of the wedge-shaped refractive material. The wedge-shaped prism has a vertex angle α (e.g., between 2 and 25 deg.). If one surface of the prism is reflectorized (by the reflective material), a thin anamorphic beam expander/compressor can be created. In this case, it is shown that the output beam is orthogonal to the input beam. Although FIG. 2A, illustrates a reflecting wedge anamorphic compressor prism that converts an input beam with an aspect ratio of, for example, 2:1 to an output beam with an aspect ratio of, for example, 4:3, one skilled in the art would recognize that any prism designed for anamorphic compression can be used as an expander by reversing the direction of the input and vice versa. The ray-trace equations of the prism are $$I1 = \phi, \quad (1)$$

$$I'_1 = \arcsin\left(\frac{\sin I_1}{n}\right), \quad (2)$$

$$I_2 = \alpha + I'_1 = I'_2, \quad (3)$$

$$I_3 = I_2 + I'_2 + I_1 - I'_1 - \phi, \quad (4)$$

$$I'_3 = \arcsin(n \sin I_3), \quad (5)$$

$$\delta = \phi + I'_3. \quad (6)$$

Here, $\alpha \cong (I_3 - I_1')/2$ and $\phi$ is the tilt angle of surface 1 from the vertical. $\phi$ and $\alpha$ may be adjusted until the desired compression or expansion ratio is obtained. For instance, for a prism of B270 optical crown glass ($n_d$=1.5229) with $\phi$=16.9 deg and $\alpha$=14.0 deg, an anamorphic compression A'/A=MAG≈0.375 can be obtained. Typically, two of these reflective wedges, placed orthogonally to maintain the image aspect ratio, would result in a shortening the focal length required of the focusing lens system by 50% or more. This effect may be used to create a more compact device.

Figure 3:
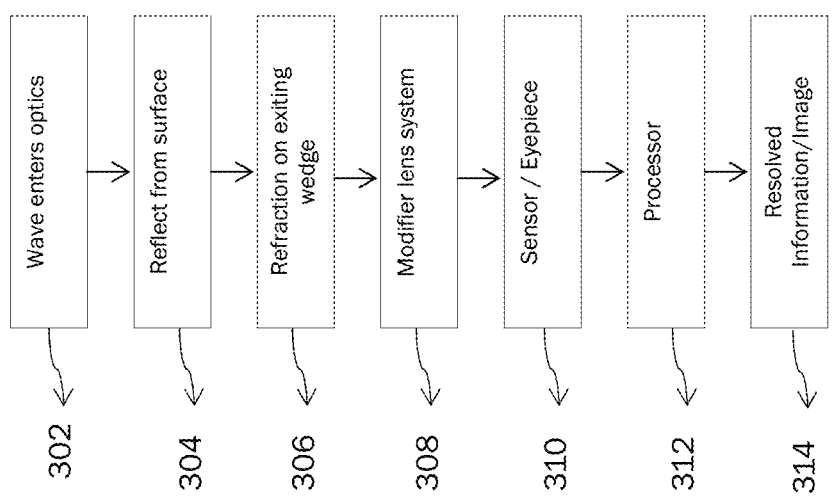
FIG. 3 is an exemplary process flow, according to some embodiments of the disclosed invention.

Compressing the image using this technique allows the image to be focused in a shorter distance while maintaining resolution. A shorter focal distance allows for a more compact device. This means higher quality images can be captured faster with a smaller lens system. FIG. 3 is an exemplary process flow, according to some embodiments of the disclosed invention. In block 302, an EM energy (which may or may not contain an image) enters an optical system comprising one or more flat (wedge) lens. The EM energy goes through the medium and bounces off a reflective surface, in block 304. In this example, it is assumed that the EM wave is visible light forming an image. However, as explained above, the disclosed invention is not limited to visible light and images, rather, it is applicable to any EM wave/energy. The reflected EM wave then travels through the medium and exits the optical elements, in block 306, where the EM wave will be compressed or expanded in one or more plane(s). In block 308, the EM wave may then travel through an optional modifying (focusing and correcting) lens system. In block 310, the EM wave strikes one or more EM sensor(s) or optical element(s) for human eye viewing. Block 302 to block 308 may be repeated multiple times to compress the EM Wave in multiple planes. In the case of imaging, the compressed output aperture from 306 reduces the required focal length which reduces the corresponding device size. In block 312, a processor, such as an image or EM wave processor, receives the information from the EM sensor and modifies/enhances this information, as required by the application of the flat lens. This can also be used to expand/spread the image if the application is directed to a microscopic function, where the sequence is partially reversed.

In block 314, in the case of imagery application, the (image) processor corrects aberrations from the lens system. The refracting wedge lens can introduce chromatic aberrations, but does not introduce other aberrations usually associated with circular lens systems. The chromatic aberration can be predetermined (by calculation or measurement) for each pixel. A table can be used to offset each color at each pixel to reposition the pixel at the appropriate position in the resolved image.

Alternatively, or in combination, hardware (optical) processing of the image may be performed by achromatic elements, such as achromatic wedge(s). An anamorphic prism for correcting an anisotropy of a radiation angle of a beam is described in U.S. Pat. No. 4,750,819, the entire contents of which is hereby expressly incorporated by reference. The anamorphic prism is formed as an achromatic structure using a first prism and a second prism. The refractive indexes and refractive index changes as a result of a wavelength fluctuation of the first and second prisms and an incident angle of the beam to the first prism can satisfy a predetermined relationship, where the beam can emerge from the second prism at an exit angle of 0 degree, which corrects the anisotropy of the angle of the beam.

The flat lens system of the disclosed invention collects the EM waves, such as visible and/or non-visible light, with a much larger aperture-to-device depth ratio. This means higher quality images can be captured faster with a smaller lens system.

The flat lens system may be very large for telescopes for example, and small for microscopes, and yet maintain a large aperture-to-device depth ratio. The image sensors are often charge coupled devices (CCDs) or CMOS sensors. The disclosed invention is not limited to the above examples of imaging sensor, rather, other types of EM or imaging sensors may be used with the flat lens of the disclosed invention. Human eye viewable optical elements may also be used. In the case of human eye viewable optical elements, blocks 308 to 314 may not be required because the human eye can focus the image.

In block 312, one or more processor(s), such as an image or EM wave processor(s), receives the information from the EM sensor(s) and modifies/enhances this information, as required by the application. This can also be used to expand/spread the image if the application is directed to a microscopic function, where the sequence is partially reversed.

In the case of a three dimensional (3D) imaging, more EM sensors may be required, as known in the art. The invention is not limited to the above examples of imaging sensor, rather, other types of EM or imaging sensors may be used with the flat lens of the disclosed invention.

Figure 4:
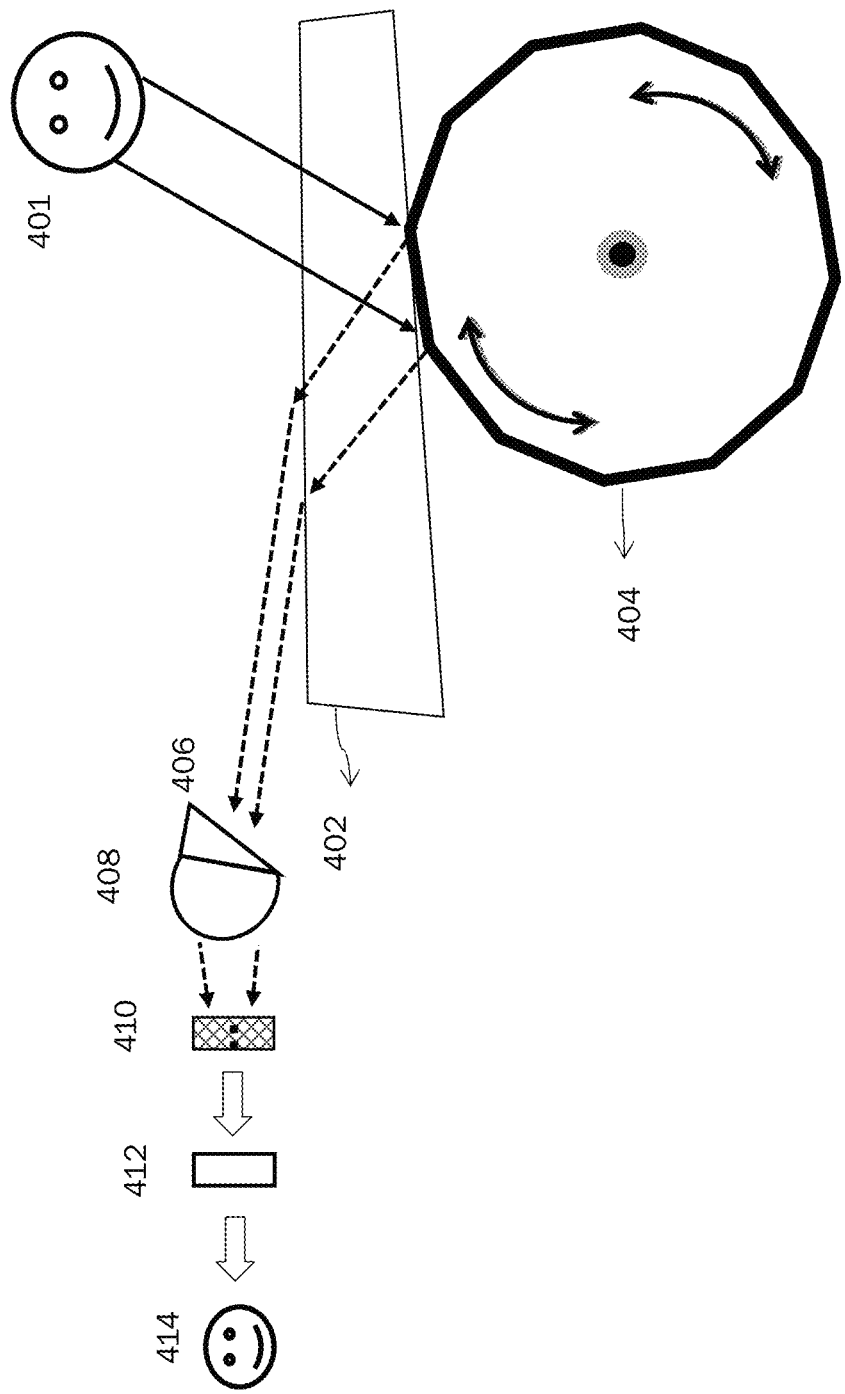
FIG. 4 depicts an exemplary flat (wedge) lens with a moving reflective surface, such as one or more moving mirrors, according to some embodiments of the disclosed invention.

FIG. 4 depicts an exemplary flat (wedge) lens with a moving reflective surface, such as one or more moving mirrors, according to some embodiments of the disclosed invention. As shown, the image of an object 401 is reflected from multiple surfaces of the flat (wedge) lens, processed and compressed to form a compressed image 414 of the same object. Light (EM) waves at the two ends of object 401 are penetrated into the refractive material 402 and reflected from moving mirrors 404 at varying angles to form a smaller size (compressed) image 406 of the original object 401.

The compressed image 406 may optionally get directed to an optional focusing lens 408 to focus the compressed image onto light sensor(s) 410 (for example, CCD or CMOS sensor(s)). An image processor 412 (implemented in software, hardware and/or firmware) corrects for any aberrations resulting from the lens system by using one or more image processing techniques and output a corrected compressed image 414. If the image processing is performed by an optical device (hardware), the correction is done before the image is received by the sensor. However, if the image processing is performed by software (executed on a processor), the corrections are performed after the image is received by the image sensor, that is, at the output of the sensor.

In these lens systems with moving reflective surface, the quality of the image is increased by reducing the field of view, and stitching many images together. This technique can improve final image resolution. Moving the mirror changes the view of what objects appear in the image. In these embodiments, the mirror is moved in a way that it can captures a series of images, each with a narrow field of view. The system then uses known image processing techniques to combine or stitch the captured images together into one composite image with a large field of view. For example, known image stitching methods may be used to register, calibrate and blend the images to produce the final image 414. Because the imaging system has a relatively large aperture size with lots of light, images can be captured very quickly. Another reason to move the mirror is to adjust the field of view, or change the compression of one single image, for example, for digital or optical zooming applications.

Figure 5:
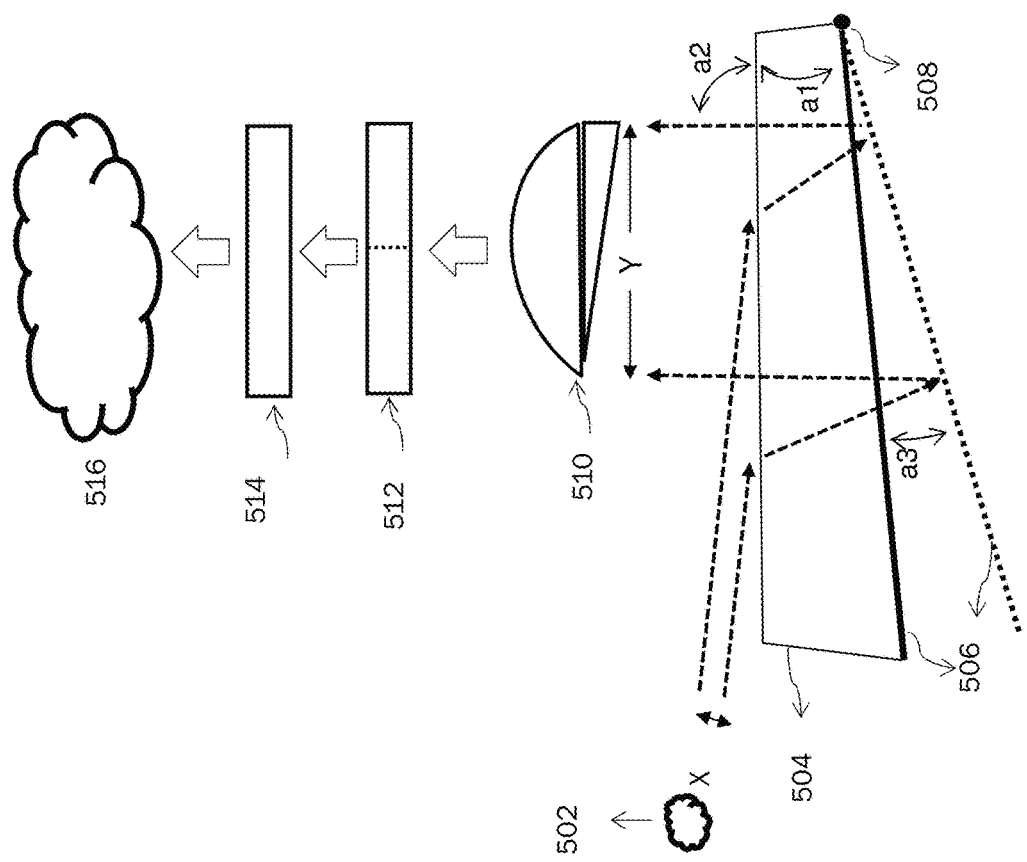
FIG. 5 shows an exemplary flat lens for expanding EM waves, according to some embodiments of the disclosed invention.

There are several different techniques to move the mirror 404. Although mirror 404 is shown as rotating, in some embodiments, it is possible to tilt the reflective surface (e.g., a mirror) about a fulcrum, or rotate about the edge as shown in FIG. 5. In some embodiments, the mirror can be an array of micromirrors. The moving reflective surface(s) of the flat lens system may be combined with the dynamic changing of the refractive index of the refractive wedge-shaped material (as described above) to further enhance the lens system.

FIG. 5 shows an exemplary flat lens for expanding EM waves, according to some embodiments of the disclosed invention. FIG. 5 described below, illustrates a microscopic function, where the EM paths are reversed with respect to those depicted in the example of FIG. 2. Light leaves a small size (X) object 502, and enters a wedge 504 where it is expanded, and reflected off a reflective surface 506, such as a mirror. The light then exits the wedge into a lens system 510, light sensor 512, and image processor 514. The processed image is an expanded image 516 of the small size image 502. Further expanding the expanded image 516, for example, by varying the angle a1 and/or a2 and/or a3 and/or configuring multiple wedges in series to further expand the small object image 502, the function of a microscope can be realized with a much smaller device and/or enable higher resolution and/or viewable area. In some embodiments, the wedge may include an anti-reflective coating(s) to capture more of the light energy leaving the small object. Similar to flat lens systems of FIG. 4, if the image processing is performed by an optical device (hardware), the correction is done before the image is received by the sensor(s). However, if the image processing is performed by software (executed on a processor), the corrections are performed after the image is received by the image sensor(s), that is, at the output of the sensor(s).

There are several known image processing methods to correct the image aberration caused by the flat lens. The use of these known methods is dependent upon the application of the flat lens. For example, lookup tables may be used to correct the aberrations as a relatively simple correction for chromatic aberrations. Moreover, transfer functions may be appropriated when fixing chromatic aberrations in a flat lens application.

In some applications, there may be a low intensity of EM energy, such as in low light applications (e.g., night vision, or for example Raman Spectroscopy of biological tissue where high power lasers may damage the tissues). In these applications, the large aperture of the lens system of the disclosed invention is capable of collecting a large amount of light energy, and still use a very compact design.

In some embodiments, the disclosed invention is capable of capturing and optionally process multispectral or hyperspectral imaging, which is used to collect and process information from across the electromagnetic spectrum to obtain the spectrum for each pixel in an image of a scene, with the purpose of finding objects, identifying materials, or detecting processes in the image of the scene.

In some embodiments, the disclosed invention is scalable and applies to a full range of system sizes including those from small microscopic/nano systems to large telescopic systems greater than, for example, 30 m is length or diameter.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope of the invention as defined by the appended claims and drawings.

The invention claimed is:

1. A flat lens system comprising:
    a wedge-shaped refractive material having a first surface and a second surface for refracting incident light beams from an object from the first surface towards the second surface, the incident light beams having a width of Y; and
    a reflective material positioned at the second surface of the wedge-shaped refractive material for reflecting the refracted light beams at a first angle toward the first surface, wherein the reflected light beams are refracted from the first surface at a second angle and having a width of X to be used to form an image of the object.

2. The flat lens system of claim 1, wherein X is smaller than Y to compress the image of the object.

3. The flat lens system of claim 1, wherein X is larger than Y to expand the image of the object.

4. The flat lens system of claim 1, further comprising a focusing lens to focus the image of the object onto a sensor.

5. The flat lens system of claim 1, further comprising a focusing lens to focus the image of the object onto an eyepiece for viewing by a human.

6. The flat lens system of claim 1, further comprising an apparatus for processing the image of the object to reduce chromatic aberrations of the image of the object.

7. The flat lens system of claim 6, wherein the apparatus for processing the image is an image processing device executing an image processing programming code to reduce said chromatic aberrations.

8. The flat lens system of claim 6, wherein the apparatus for processing the image comprises of one or more refractive optical wedges that together have an achromatic effect to reduce said chromatic aberrations.

9. The flat lens system of claim 6, wherein the apparatus for processing the image comprises of one or more diffraction gratings that together have an achromatic effect to reduce said chromatic aberrations.

10. The flat lens system of claim 1, wherein the refractive or reflective material has one or more coatings at the first or the second surface.

11. The flat lens system of claim 1, wherein the reflective material is attached to the second surface of the wedge-shaped refractive material.

12. The flat lens system of claim 1, wherein the reflective material comprises of one or more moving mirrors to reflect the refracted light beams at varying angles toward the first surface.

13. The flat lens system of claim 12, wherein the one or more moving mirrors are rotated or tilted to reflect the refracted light beams at varying angles.

14. The flat lens system of claim 1, further comprising an electric energy source electrically coupled to the wedge-shaped refractive material to dynamically change a refractive index of the refractive material to refract the incident light beams at varying angles.

15. The flat lens system of claim 1, further comprising one or more wedge-shaped refractive material(s) positioned between the wedge-shaped refractive material and the reflective material.

16. A telescope comprising the flat lens system of claim 1.

17. A microscope comprising the flat lens system of claim 1.

18. A binocular comprising the flat lens system of claim 1.

19. A scope comprising the flat lens system of claim 1.

20. A telecentric lens system comprising the flat lens system of claim 1.

* * * * *